US010662275B2

(12) United States Patent
Lai et al.

(10) Patent No.: US 10,662,275 B2
(45) Date of Patent: May 26, 2020

(54) GUANYLUREA ALCOHOL PHOSPHATES AND THEIR USE AS REACTANTS IN POLYURETHANE AND EPOXY RESIN APPLICATIONS

(71) Applicant: Lubrizol Advanced Materials, Inc., Cleveland, OH (US)

(72) Inventors: John Ta-Yuan Lai, Broadview Heights, OH (US); Janean Nagorski, Akron, OH (US)

(73) Assignee: LUBRIZOL ADVANCED MATERIALS, INC., Cleveland, OH (US)

( * ) Notice: Subject to any disclaimer, the term of this patent is extended or adjusted under 35 U.S.C. 154(b) by 124 days.

(21) Appl. No.: 15/749,057

(22) PCT Filed: Jul. 26, 2016

(86) PCT No.: PCT/US2016/044037
§ 371 (c)(1),
(2) Date: Jan. 30, 2018

(87) PCT Pub. No.: WO2017/023613
PCT Pub. Date: Feb. 9, 2017

(65) Prior Publication Data
US 2018/0215857 A1    Aug. 2, 2018

Related U.S. Application Data

(60) Provisional application No. 62/199,456, filed on Jul. 31, 2015.

(51) Int. Cl.
| | |
|---|---|
| *C08G 18/32* | (2006.01) |
| *C09D 175/04* | (2006.01) |
| *C08L 75/04* | (2006.01) |
| *C08G 18/50* | (2006.01) |
| *C08G 18/76* | (2006.01) |
| *C08K 5/00* | (2006.01) |
| *C08G 101/00* | (2006.01) |

(52) U.S. Cl.
CPC ..... *C08G 18/3228* (2013.01); *C08G 18/3268* (2013.01); *C08G 18/5084* (2013.01); *C08G 18/7621* (2013.01); *C08L 75/04* (2013.01); *C09D 175/04* (2013.01); *C08G 2101/00* (2013.01); *C08G 2101/0025* (2013.01); *C08K 5/0066* (2013.01); *C08L 2201/02* (2013.01)

(58) Field of Classification Search
CPC ............ C08G 18/3228; C08G 18/3268; C08G 18/7621; C08G 18/5084; C08G 2101/00; C09D 175/04; C08L 75/04; C08L 2201/02; C08K 2101/0025
See application file for complete search history.

(56) References Cited

U.S. PATENT DOCUMENTS

| | | | |
|---|---|---|---|
| 5,010,113 A | | 4/1991 | Blount |
| 5,089,559 A | * | 2/1992 | Blount ............... C08G 18/3889 525/107 |

FOREIGN PATENT DOCUMENTS

WO    2017/023613 A1    2/2017

OTHER PUBLICATIONS

Search Report of Corresponding International Application No. PCT/US2016/044037 dated Oct. 21, 2016.
Written Opinion of Corresponding International Application No. PCT/US2016/044037 dated Oct. 21, 2016.

* cited by examiner

*Primary Examiner* — Mark Eashoo
*Assistant Examiner* — Andrew J. Oyer
(74) *Attorney, Agent, or Firm* — Vincent A. Cortese; Teresan W. Gilbert

(57) ABSTRACT

Guanylurea alcohol phosphate salts are disclosed. Flame retardant thermoplastic and thermoset polymers can be made by incorporating said guanylurea alcohol phosphate salts into polymers and these polymers have improved properties over similar thermoplastic or thermoset polymers where guanylurea phosphate salts are added as flame retardant dispersions to said polymer. Flame retardant polyurethane foams where the guanylurea alcohol phosphate salts have been incorporated into the polyurethane are a particularly preferred embodiment.

15 Claims, No Drawings

GUANYLUREA ALCOHOL PHOSPHATES AND THEIR USE AS REACTANTS IN POLYURETHANE AND EPOXY RESIN APPLICATIONS

CROSS REFERENCE TO RELATED APPLICATION

This application claims priority from PCT Application No. PCT/US2016/044037 filed Jul. 26, 2016, which claims the benefit of U.S. Application No. 62/199,456 filed Jul. 31, 2015.

FIELD OF INVENTION

Guanylurea phosphoric acid salts are known as flame retardants that can be physically mixed with polymers to form flame retardant polymers. However, both components of guanylurea phosphoric acid salts are very water soluble and the components of the salt can be removed from the polymer by water or polar solvent leaching. The phosphoric acid is first reacted with a polyhydric alcohol to make it into a mono or polyhydroxyl function phosphate ester that can then be reacted into polyurethanes or polyepoxide compositions via its reactive hydroxyl group(s). The phosphate group of the phosphate ester can be reacted with dicyanodiamide and water to form the guanylurea salt before or after incorporation into a polyurethane or polyepoxide. The reaction product of the polyhydric alcohol and phosphoric acid (the mono or polyhydroxyl phosphate ester, providing it has residual hydroxyl groups) can be incorporated into a polymer by reacting with a polyisocyanate and/or polyepoxide. Similarly, the guanylurea portion of the salt can be incorporated into a polymer if it still has reactive amine groups. These bonds to a polymer will help retain the flame retardancy, even if the article is subjected to washing or leaching with water.

BACKGROUND OF THE INVENTION

As a society we want polymeric materials with a variety of desirable physical properties in our rooms, housing, vehicles, shopping centers, offices, factories, restaurants, theaters, sports complexes, etc. In most of these applications we would also like a certain degree of fire retardancy so that in the event of a fire, any occupants or visitors could safely exit the structure before they are overcome by smoke, heat, carbon monoxide or dioxide, etc.

As a society we would also like the manufacturing, recycling, and disposal of the construction materials used in the above structures to not unduly contaminate the environment. Halogenated flame retardant compounds (while used extensively in the past) represent some hazards to society in terms of contamination of the environment by manufacturing and disposal. They can also generate of acidic fumes in the event of a fire. Flame retardants based on phosphoric acid and amine compounds are similar to biological molecules in animals and plants. Some phosphoric acid species and amine species could be biodegraded back into nutrients for plants or animals. Phosphoric acid species and amine species also tend to generate less overwhelming fumes than halogenated flame retardants.

Guanylurea salts of phosphoric acid species as particulates have been used in the past as a somewhat inorganic flame retardant material for cellulosic products and some polymers. However, the water solubility of guanylurea and phosphoric acid species always generates some concern that flame retardant properties will be lost by washing or leaching with polar or water based solutions. It would be desirable if guanylurea and phosphoric acid migration from construction materials could be slowed down or prevented in the event of exposure to water or polar solvents.

GB1453296 teaches a flameproofing organic fibre material and a preparation for use therein. It includes phosphonium compounds and amine compounds such as dicyanadiamide cyanourea, and guanylurea.

U.S. Pat. No. 6,652,633 teaches a Fire Retardant that includes guanylurea phosphate and boric acid along with materials such as wood and composite wood products.

U.S. 2003/0083393A1 teaches a method for producing a rigid polyurethane foam using a polyol a polyisocyanate in the presence of an amine catalyst and a blowing agent.

U.S. 2013/220170 teaches flame retardant compositions for cotton articles using tetrakishydoxyalkyphonhonium salt with caprolactam and urea.

SUMMARY OF THE INVENTION

As disclosed above, various phosphorus and nitrogen compounds have been used to impart flame retardancy to materials. However, mere physical incorporation of such water soluble flame retardants leaves open the possibility that the flame retardants will be washed or eluted out of the polymer or other article. Disclosed is a way to make the phosphorus compound chemically bound into the polymer and potentially bind the amine component into the polymer, minimizing the risk that the flame retardants will be lost during water immersion.

Various forms of phosphorus acid can be reacted with alcohols (also known as polyols when they have two or more hydroxyl groups) to yield mono or polyhydroxyl functional phosphate esters. Depending on the number of hydroxyl groups on the polyol, more than one phosphorus acid can be reacted with the polyol yielding phosphate esters with residual hydroxyl groups.

The mono or polyhydroxyl functional phosphate ester (hereinafter "functional phosphate ester") can be reacted with a compound with an oxirane ring or with a reactive isocyanate group (an epoxy compound or polyisocyanate) to build the molecular weight of the reaction product, create a prepolymer, or to create a polymer. After reaction of the hydroxyl(s) of the functional phosphate ester with an epoxy compound or isocyanate compound, the phosphate group can still be salted with dicyanodiamide and water to form the guanylurea salt. Alternatively, the functional phosphate ester can be first reacted with the dicyanodiamide and water forming the guanylurea salt and then the salt of the functional phosphate ester and guanylurea can be reacted with the isocyanate or epoxy compound to create higher molecular weight compounds, oligomers, or polymers.

The resulting epoxy polymers and/or urethane polymers can be a) used as flame retardant polymers or articles, used in coatings on flammable or inflammable substrates, used in fibers, or used in particulate or fiber reinforced polymer composites (such as epoxy circuit boards or electronic components), urethane foams, etc. The epoxy and urethane polymers can incorporated into other polymers (or used by themselves) in the above end uses.

DETAILED DESCRIPTION OF THE INVENTION

The term "wt. %" means the number of parts by weight of ingredient per 100 parts by weight of the composition or material of which the ingredient forms a part.

As used herein, the mono or polyhydroxyl phosphate ester may contain more than one group of a phosphorus atom bonded to three oxygen ions (phosphonate) or a phosphorus atom bonded to four oxygen ions (phosphate). The phosphate moiety may contain mono-, di-, tri-, or higher phosphate, or a mono-, and/or di-phosphonate, and in particular a mono-, diphosphate, triphosphate or monophosphonate. Preferably the polyphosphate moiety is a mono-, di-, or tri-phosphate.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:
  (i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);
  (ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);
  (iii) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. As used herein, an alkyl group containing an oxygen atom is referred to as an alkoxyl group.

The term "coating" is used herein to refer to impregnation, saturation, roller, brush, spray, foam and curtain coating and similar procedures.

As used herein the term "polymer" refers to the product of a polymerization reaction in which the molecules of one or more monomers are linked together to form large molecules whose molecular weight is a multiple of that of the one or more monomers. These polymers may be homopolymers or copolymers. These polymers may be linear polymers, branched polymers, cross-linked polymers, or a mixture of two or more thereof. The term oligomer or oligomeric is used when it is obvious the molecular weight of the polymer is less than 20,000 or 30,000 g/mole to indicate an understanding that the polymer is of limited molecular weight. The terms oligomer and polymer are not intended in this particular document to be mutually exclusive or easily distinguished from each other.

The term "copolymer" is used herein to refer to a polymer resulting from the polymerization of two or more chemically distinct monomers.

The term "cross-linked polymer" refers to a polymer in which the polymer molecules are linked to each other at points in their structures other than at the ends of the polymer chains. Crosslinked polymers can have better physical properties than their similar thermoplastic counterparts as or near the softening temperature of the polymer due to the higher molecular weight of the crosslinked polymer.

The term "halogen-free" or "non-halogenated" polymer refers to a polymer that does not have any halogen atoms attached to it. In one embodiment, the halogen-free polymer is a chlorine-free polymer. The term "halogen-free" does not exclude halogen that may be present at contaminate levels, for example, levels of up to about 5% by weight, and In one embodiment, up to about 2% by weight, and In one embodiment, up to about 1% by weight, and In one embodiment, up to about 0.5% by weight, and In one embodiment, up to about 0.2% by weight, and In one embodiment, up to about 0.1% by weight.

In a simplest aspect of the invention, there is provided a novel flame retardant mono or polyhydroxyl functional phosphate ester additive that is capable of being converted to a salt of guanylurea by reacting with dicyanodiamide and water before or after being incorporated via covalent chemical bonds into a urethane or epoxy oligomer or polymer. In one preferred embodiment the polyol reacted with the phosphoric acid source comprises both primary and secondary hydroxyl groups. The secondary hydroxyl groups are less reactive with the phosphoric acid source than the primary hydroxyl groups. Therefore more of the secondary hydroxyl groups than the primary hydroxyl groups remain after the reaction with the phosphoric acid source. Glycerol is a preferred alcohol or polyol as it has two primary hydroxyl groups that can be phosphated and generally the remaining secondary hydroxyl group would be preserved to react with an isocyanate group or an epoxy group to form an oligomer or polymer.

The polyol to be reacted with the phosphoric acid source can be any polyol (two or more hydroxyl groups) of less than 20,000 g/mole number average molecular weight, more desirably less than 10,000 g/mole and preferably less than 5,000 or 2,000 g/mole. Desirably, the polyol has three or more hydroxyl groups or a percentage of a mixed polyol system has some polymeric species of higher molecular weight and some low molecular weight species with three or more hydroxyl groups, such as glycerol. In one embodiment, the polymeric species of more than 200 g/mole number average molecular weight desirably comprise at least 50 wt. % of an alkylene oxide repeat units selected from ethylene, propylene, and butylene. In one embodiment, desirably at least 20, 40, or 50 wt. % of the polyol species reacted with the phosphoric acid is glycerol.

The phosphoric acid source used to make the mono or polyhydroxyl phosphate ester compound can be any source known to generate phosphoric acid when reacted with hydroxyl functional material. Examples of phosphoric acid sources include agents known as phosphating agents which include $POCl_3$, $P_2O_5$ and especially polyphosphoric acid.

The low molecular weight polyols such as glycerol make a reaction product with the phosphoric acid source that is a solid at many use temperatures, such as 20-40° C. Using a higher molecular weight polyol such as an ethoxylated glycerol or propoxylated glycerol makes a phosphate ester that is more likely to be a liquid at 20-40° C. However the phosphates esters with higher percentages of hydrocarbon or alkylene oxide segments are more viable as a fuel source for flames than phosphate esters from glycerol. Therefore there is often a balance in the choice of the polyol used to make the mono or polyhydroxyl phosphate ester such that enough higher molecular weight polyol is used to make the phosphate ester easily processable as a liquid at room temperature in subsequent steps and enough low molecular weight polyol to maximize the flame retardancy of the final product.

A flame retardant additive is one that imparts flame retardancy to a polymer in which it is incorporated. Flame retardancy can be achieved in a variety of ways. A less flammable composition may give off non-flammable gaseous (water vapor) or liquid byproducts that keep the substrate cool. The composition may form a char that insulates the composition from the flame and blocks oxygen and heat from the composition surface (to inhibit a flame by keeping the fuel and oxygen separate). Amine salts of phosphate esters provide flame retardancy by forming less flammable deposits near the composition surface, which can also block heat from raising the temperature of the composition.

The flame retardant additive of this disclosure is desirably incorporated into a urethane oligomer or polymer or epoxy oligomer or polymer to minimize extractability with water and polar solvents. The co-polymerizable mono or polyhydroxyl phosphate ester (optionally reacted with an isocyanate compound or epoxy compound) can be blended with other polymers or materials or can be copolymerized into other polymers. The phosphate ester guanylurea salt is not as effective of a flame retardant when diluted with flammable additives or polymers. Thus, in some potential uses the flame retardant additive can be diluted with other oligomers, polymers and additives to enhance other useful properties, but in other applications where maximum flame retardancy is needed, the number and amounts of diluents that would inherently serve as good fuel sources should be minimized.

In general, the amine species for use in the novel flame retardant monomer composition can be dicyanodiamide and water which forms the guanylurea salt with an acid. Other sources of amine species are taught in the prior art to be complexed with phosphate compounds. Some of the amine species are liquid and volatile, other are like melamine and solids. Dicyanodiamide and water forming the guanylurea salt is highly preferred in this disclosure.

Another aspect of the invention is a flame retardant polymer. In one embodiment, the flame retardant polymers may be homopolymers or copolymers comprising the novel flame retardant monomer (mono or polyhydroxyl phosphate ester) of the simplest aspect of the invention. In another embodiment, the flame retardant polymers may be a copolymer comprising at least the mono or polyhydroxyl phosphate ester and a reactive species therewith selected from isocyanate compound and/or epoxy compound as defined later. A feature of this disclosure is that the isocyanate compound and/or epoxy compound makes the phosphate ester less extractable by polar solvents or water and makes the phosphate ester more compatible with the less polar urethane polymer or epoxy polymer. Then the dicyanodiamide and water is effective to form the guanylurea salt the phosphate ester and makes a more effective flame retardant than the phosphate ester alone.

In one embodiment, the polymer can include a cross-linking agent. Crosslinking agents for polyurethanes and epoxy compounds are well known in the art and almost any of the published crosslinkers can be used with the polymers of this disclosure. Crosslinking of the polymers helps reduce the extractability of the phosphate and guanylurea from the composition and helps maintain the shape and location of the polymers if exposed to heat. Thermoplastic polymers (not crosslinked) sometimes melt and flow in fires and if the liquid polymer is burning the fire can be spread by dripping flaming polymer. Thus a crosslinked polymer (that doesn't flow when exposed to high temperatures in a flame) can sometimes be better than a thermoplastic (non-crosslinked) polymer.

The primary and secondary amine groups of the guanylurea can also react chemically with the isocyanate compound or the epoxy compound to form a covalent chemical bond between the reacting molecules. Amine groups are generally more reactive (lower activation temperature) than primary or secondary hydroxyl groups. The bond is a urea linkage if an amine group reacts with an isocyanate group. In some embodiments it is desirable to first react the mono or polyhydroxyl phosphate ester with the isocyanate compound and/or epoxy compound prior to adding the dicyanodiamide and water to limit the bonds initially formed to those derived from the hydroxyl groups. In other embodiments such as the urethane foam generation, it is desirable to first salt the mono or polyhydroxyl with the dicyanodiamide and water and then add the isocyanate compound and/or epoxy compound. The amine groups in the guanylurea can act as a catalyst for the reaction of the isocyanate groups or epoxy groups with hydroxyl groups and or amine groups, lowering the required reaction temperature or required reaction time for these groups to chemically react. This happened in the urethane foam example 6 of this disclosure. If excess water is present in the guanylurea the extra water can react with isocyanate groups according to the reaction —NCO+$H_2O$→—$NH_2$+$CO_2$. The $CO_2$ can act as a blowing agent causing foam in the reaction product. The terminal $NH_2$ group can react with another isocyanate group to form a urea linkage.

Polyurethanes (oligomers or polymers) of this invention are formed from at least one isocyanate compound and at least one NCO-reactive compound (such as the mono or polyhydroxyl phosphate ester).

Isocyanate Compound

Suitable isocyanate compounds have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Monofunctional isocyanates can be used, for example, as molecular-weight controlling agents or making the phosphate ester compound less polar. Isocyanate compounds can also be made from polyisocyanates reacted with isocyanate reactive species to build oligomeric polyisocyanates.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, lysine diisocyanate and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, isophorone diisocyanate, cyclohexane diisocyanate, bis-(isocyanatomethyl) cyclohexane, methylcyclohexane diisocyanate, cyclohexane triisocyanate, their isomers and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include diphenylmethylene diisocyanate, toluene diisocyanate, phenylene diisocyanate, naphthalene diisocyanate, tetrahydronaphthalene diisocyanate, biphenylene diisocyanate, dimethyl biphenylene diisocyanate, dichloro biphenylene diisocyanate, triphenyl methane triisocyanate, their isomers, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Dimers, trimers, and oligomers of the above mentioned isocyanates may also be used. Examples include polymeric MDI.

Isocyanate compounds can be used as a single isocyanate type compound or in combination of two or more different isocyanate compounds.

NCO:OH Ratio

Controlling the isocyanate group (NCO): isocyanate reactive (normally OH, NH or $NH_2$) group ratio is a common way to control reactions and molecular weight in urethane forming reactions. When one wants to keep molecular weights low, one varies the ratio away from 1 (such as 2:1 or 1:2) such that isocyanate or isocyanate reactive groups predominate and one creates a low molecular weight oligomer capped with the reactive group present in excess. For this purpose, the ratio of isocyanate equivalents to active hydrogen in the prepolymer typically ranges from about 2.5:1 to about 1:2.5, preferably from about 2:1 to 1:2, and more preferably with the isocyanate group in excess such as from about 2/1 to about 1.2/1.

An OH-terminated or NH or N terminated polymer can also be made if desired. In this case, an excess of OH and NH equivalents over NCO equivalents is used.

Active-Hydrogen/Isocyanate-Reactive Compounds Including Polyol Macro Monomer, Crosslinkers, Chain Extenders, etc.

An isocyanate-reactive compound or active-hydrogen containing compound is one that provides a source of active hydrogen for reacting with isocyanate groups via the following reaction: —NCO+H—X→—NH—C(═O)—X, can be used as the NCO-reactive compound in this invention. These compounds can be reacted with the isocyanate compounds, the epoxy compounds, and the mono or polyhydroxyl phosphate ester (or their reaction products) to impart more polymer type physical properties (so the reaction product mixtures behave more like conventional polyurethanes or epoxy based polymer and less like particulate flame retardants). Preferred examples of active-hydrogen groups include but are not limited to OH groups on polyols and amine groups on polyamines. Such compounds typically range widely in molecular weight from 18 g/mol for water and 17 g/mol for ammonia to about 10,000 g/mol. They are customary divided into two subclasses depending on their molecular weight: Polyol or polyamine macro monomers with number-average molecular weight from about 500 to 10,000 g/mol and chain extenders with molecular weight from 18 to 500 g/mol. The extremes of the scale represent physical reality: High-molecular-weight polyols and polyamines contribute to the soft segment and short chain extenders contribute to the hard segment of polyurethane; however, the exact position of the divider is somewhat arbitrary and can be moved depending on the circumstances. Both classes are reviewed below in more detail.

Polyol and Polyamine Macro Monomers

The term "polyol and polyamine macro monomers" in the context of the present invention means any high molecular weight product ($M_n$>500 g/mol), typically referred to as a long-chain, which has an active hydrogen that can be reacted with isocyanates and includes materials having an average of about two or more hydroxyl or other NCO-reactive groups per molecule.

Such long-chain polyols include polyether, polyester, polycarbonate and polycaprolactone with two or more NCO-reactive groups. Other examples include polyamide, polyester amide, polyacetal, polythioether, polysiloxane, ethoxylated polysiloxane, halogenated polyester and polyether, polybutadiene, hydrogenated polybutadiene, polyisoprene, polyisobutylene, alkyd-modified and polythioether polyols, hydroxyl-containing acrylic and methacrylic polymers and copolymers, hydroxyl-containing epoxies, and the like, and mixtures thereof. Combinations of different types of macromolecules may be used.

The polyether, polyester and polycarbonate macro monomers are preferred.

Polyether macro monomers are obtained in known manner by reaction of starting compounds that contain reactive hydrogen atoms, such as water or the diols set forth for preparing the polyester polyols, with alkylene oxides, such as ethylene oxide, propylene oxide, butylene oxide, styrene oxide, tetrahydrofuran, epichlorohydrin, and mixtures thereof. Preferred polyethers include polytetrahydrofuran (PTHF) and poly(propylene glycol) (PPG). Examples include Terathane® PTHF polyols from Invista and Acclaim™ PPG diols with lower monol contents from Arco Chemical. Difunctional polyol initiators can be used and one or two terminal amine groups can be added at the end of the polymerization to form amine terminal groups on a polyether. These are commercially available from Huntsman Chemical as Jeffamines™ or Sulfonamines™.

The polyester macro monomers typically are esterification products prepared by the reaction of organic polycarboxylic acids or their anhydrides with a stoichiometric excess of a diol or aminoalcohols. Examples of suitable polyols for use in the reaction include polyglycol adipates, polyethylene terephthalate polyols, polycaprolactone polyols, orthophthalic polyols, sulfonated polyols, and the like, and mixtures thereof.

The diols used in making the polyester macro monomers can be aliphatic, cycloaliphatic or aromatic and include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcyclohexane), 2-methyl-1,3-propanediol, 2,2,4-trimethyl-1,3-pentanediol, 2-butyl-2-ethyl prorane-1,3-diol, Versatic™ alcohols produced from CARDURA E10P (Hexion), triethylene glycol, tetraethylene glycol, polyethylene glycol, dipropylene glycol, polypropylene glycol, dibutylene glycol, polybutylene glycol, caprolactone diol, dimerate diol, hydroxylated bisphenols, polyether glycols, halogenated diols, and the like, and mixtures thereof. Preferred diols include ethylene glycol, butylene glycol, hexane diol, and neopentyl glycol.

Suitable carboxylic acids used in making the polyester macro monomers include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, tetrabromophthalic anhydride and acid, dimeric fatty acids such as oleic acid, and the like, and mixtures thereof. Preferred polycarboxylic acids used in making the polyester polyols include aliphatic or aromatic dibasic acids.

The preferred polyester macro monomer is a diol. Preferred polyester diols include hexane diol neopentyl glycol adipic acid polyester diol, e.g., Piothane™ 67-3000 HNA (Panolam Industries) and Piothane 67-1000 HNA; as well as propylene glycol maleic anhydride adipic acid polyester diols, e.g., Piothane 50-10000 PMA; and hexane diol neopentyl glycol fumaric acid polyester diols, e.g., Piothane 67-500 HNF. Other preferred polyester diols include Rucoflex™ S1015-35, S1040-35, and S-1040-110 (RUCO Polymer Corp.).

Polycarbonate macro monomers include those obtained from the reaction of diols such 1,3-propanediol, 1,4-butanediol, 1,6-hexanediol, diethylene glycol, triethylene glycol, tetraethylene glycol, and the like, and mixtures thereof with diarylcarbonates such as diphenyl carbonate or phosgene.

Polysiloxane macro monomers are characterized by the presence of the —$R_1R_2SiO$— repeat units which can contain alkyl or aryl groups such as polydimethylsiloxanes, poly(dimethysiloxane-co-diphenylsiloxane)s, polydiphenylsiloxanes, poly(methylphenyl)-siloxanes and the like, and combinations thereof. Examples include ethoxylated poly(dimethylsiloxane) (PDMS) Y-17256 from Momentive Performance Materials and side-chain PDMS diol MCR-C61 from Gelest.

Polyester amides and polyamides. Instead of long-chain polyol macro monomers, long-chain amine macro monomers may also be used to prepare the polyurethane. Suitable long-chain amines include polyester amides and polyamides, such as the predominantly linear condensates obtained from reaction of polybasic saturated and unsaturated carboxylic acids or their anhydrides and polyvalent saturated or unsaturated aminoalcohols, diamines, polyamines, and mixtures thereof.

Diamines and polyamines are among the preferred compounds useful in preparing the aforesaid polyester amide and polyamide macro monomers. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl) amine, N-(2-piperazinoethyl)-ethylene diamine, N,N'-bis-(2-aminoethyl)-piperazine, N,N,N'tris-(2-aminoethyl) ethylene diamine, N—[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, ethylene diamine, diethylene triamine, triethylene tetramine, tetraethylene pentamine, and pentaethylene hexamine, and mixtures thereof. Other suitable diamines and polyamines include Jeffamine™ D-2000 and D-4000, which are amine-terminated polypropylene glycols, differing only by molecular weight, and which are available from Huntsman Chemical Company.

Chain Extenders (Lower Molecular Weight Isocyanate-Reactive Molecules)

Chain extenders with the molecular weight from 18 to 500 g/mol such as aliphatic, cycloaliphatic or aromatic diols or amines can be used during the formation of the polyurethanes or epoxy polymers. Water, di or higher functionality polyols, inorganic or organic polyamine having an average of about 2 or more primary and/or secondary amine groups or combinations thereof is suitable for use in this disclosure as chain extenders. Suitable di or higher functionality polyols have 2 or more hydroxyl groups and generally a hydrocarbylene structure such as ethylene glycol, propylene glycol, cycloaliphatic alcohols (e.g. various dihydroxyl cyclohexyl compounds), branched aliphatic diols like neopentyl glycol, glymes, diethylene glycol, butanediols, hexanediol, and the like, and mixtures thereof. While trihydroxyl alcohols might be useful and might provide some branching to the structure, they are less often used in polyurethanes. Suitable organic amines for use as a dispersion chain extender are the same diamines and polyamines described above as monomers for preparing polyester amides and polyamides.

Preferred amine chain extenders include ethylene diamine (EDA), diethylene triamine (DETA), triethylene tetramine (TETA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof.

Suitable inorganic amines include hydrazine, substituted hydrazines, and hydrazine reaction products, and the like, and mixtures thereof. Ammonia ($NH_3$), can also contribute to the consumption of the remaining NCO with the formation of terminal urea.

Crosslinkers

Compounds having at least one crosslinkable functional group can also be incorporated into the polyurethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslink ability include thioglycolic acid, 2,6-dihydroxybenzoic acid, melamine and its derivatives, multivalent metal compounds and the like, and mixtures thereof.

The amount of optional compounds having crosslinkable functional groups in the polyurethane will typically be up to about 1 milliequivalent, preferably from about 0.05 to about 0.5 milliequivalent, and more preferably from about 0.1 to about 0.3 milliequivalent per gram of final polyurethane on a dry weight basis.

Catalysts

Urethane oligomers or polymer may be formed without the use of a catalyst but catalysis may be employed in some instances to reduce synthesis time or temperature. Examples of catalysts include organo-tin compounds, tertiary amines and transition metal compounds. Specific examples of suitable catalysts include stannous octoate, dibutyl tin dilaurate, and tertiary amine compounds such as triethylamine and bis-(dimethylaminoethyl) ether, morpholine compounds such as beta,beta-dimorpholinodiethyl ether, bismuth carboxylates, zinc bismuth carboxylates, iron (III) chloride, potassium octoate, potassium acetate and zirconium catalysts K-KAT® XC-9213 and K-KAT® 6212 from King Industries.

The preferred catalysts are DABCO® (diazabicyclo [2.2.2]octane), from Air Products, a mixture of 2-ethylhexanoic acid and stannous octoate, e.g., FASCAT® 2003 from Elf Atochem North America, and K-KAT XC-9213 from King Industries.

The amount of catalyst used to form the prepolymer will typically be from about 5 to about 200 parts per million of the total weight of oligomer or polymer reactants.

Isocyanate Blocking Agents

Several types of compounds can be employed as blocking (a.k.a. protecting or masking) agents. Their function is to temporarily protect isocyanate groups from undesired reactions. The main requirement for the blocking compound is for its reaction with isocyanate to be reversible. When the reaction is reversed, the isocyanate group is regenerated and is available for further reactions. The reverse reaction can be triggered by physical or chemical means, for example, by elevated temperatures, radiation, vacuum, catalysts, compounds with active hydrogen, or combinations thereof.

Examples of blocking agents include oximes, phenols, alcohols, lactams, imidazoles, pyrazoles, acids, mercaptans, imides, secondary amines, sulfites, acetoacetates and derivatives of malonic acid.

Oximes are generally preferred but can be replaced partially or in full by other blocking agents. Oximes can be represented by a general formula $CRR'$=$NOH$, where R and R' may independently be H or $C_nH_{2n+1}$. R and R' may also contain cycloaliphatic, aromatic groups, and groups with heteroatoms including heterocyclic groups. The oxime may be an aldoxime when one or both R and R' are hydrogen, or ketoxime when both R and R' are hydrocarbyl groups. Examples of aldoximes include formaldoxime, acetaldoxime, propionaldoxime, butyraldoxime, benzaldoxime and the like. Examples of ketoximes include acetoxime, butanone oxime, cyclohexanone oxime, acetophenone oxime and the like.

Other preferred blocking agents include lactams, secondary and tertiary alcohols, pyrazoles and their mixtures. Some specific examples of other suitable blocking agents include dimethyl malonate, diethyl malonate, triazole, caprolactam, phenol and its derivatives, pyrazole, dimethylpyrazole, dibutylamine, diisopropylamine, tert-butanol, cyclohexanol, isopropanol and glycerine carbonate. Combinations of two or more blocking agents can be used if a stepwise reaction is desired, particularly mixtures of blocking agents which deblock at different temperatures.

The deblocking may occur during chain extension or during polymer drying and/or curing. Often it is preferred to use a blocking agent, which will evaporate from the polymer during drying or curing. In these cases, low molecular weight oximes such as acetoxime, butanone oxime, butyraldoxime and the like are preferred.

Examples of suitable flame retardant plasticizers include phosphorus-based plasticizers such as cyclic phosphates, phosphites, and phosphate esters, exemplified by Pliabrac™ TCP (tricresyl phosphate), Pliabrac TXP (trixylenyl phosphate), Antiblaze™ N (cyclic phosphate esters), Antiblaze TXP (tar acid, cresol, xylyl, phenol phosphates), and Antiblaze 524 (trixylyl phosphate) from Albright & Wilson Americas; Firemaster™ BZ 54 (halogenated aryl esters) from Great Lakes Chemicals; chlorinated biphenyl, 2-ethylhexyl diphenyl phosphate, isodecyl diphenyl phosphate (Santisizer™ 148 from Ferro), C12-C16 alkyl diphenyl phosphate (Santisizer™ 2148 from Ferro), triphenyl phosphate, cresyl diphenyl phosphate, p-t-butylphenyl diphenyl phosphate, triphenyl phosphite, and the like. Other examples of phosphorus-based plasticizers include chlorinated alkyl phosphate esters such as tris-(2-chloroethyl)-phosphate, tris-(2-chloroi sopropyl)-phosphate, tris-(1.3-dichloro-2-propyl)-phosphate, chloro alkyl diphosphate ester (Antiblaze 100 from Albright & Wilson Americas); alkyl phosphates and phosphites such as tributyl phosphate, triisobutyl phosphate, tri-2-ethylhexyl phosphate, and triisoctyl phosphite; other organophosphates and organophosphites such as tributoxy ethylphosphate (KP-140 from Chempoint); other phosphates and phosphonates such as chlorinated diphosphate and chlorinated polyphosphonate; and the like. Mixtures can also be used.

Miscellaneous Additives

The urethane and epoxy oligomers and polymers of this disclosure can be made with various additional ingredients and features in accordance with known polyurethane and polyepoxide technology. Such additives include surfactants, stabilizers, defoamers, antimicrobial agents, antioxidants, rheology modifiers, fillers, pigments, dyes, fibers, polymers, and the like and the mixtures thereof. They can optionally be added as appropriate before, during, or after most stages of the preparation.

Blends with Other Polymers

The oligomers and polymers of this invention can be combined with compatible polymers by methods well known to those skilled in the art.

Epoxy compounds are generally described as compounds with at least two epoxide groups (also known as oxirane rings or glycidyl groups). They are used in a variety of coatings, adhesives, binders, bulk polymers, etc. They use an epoxy compound and a curative and sometimes they are supplied in two separate packages and mixed just before use/curing. They can crosslink via catalytic homo-polymerization or with a wide range of co-reactants including polyfunctional amines, acids, phenols, alcohols, and thiols. The curatives are sometimes referred to as hardeners or crosslinking agents. Most of the epoxy compounds useful in this disclosure are commercially available. These include the diglycidyl ether of bisphenol A, novolac epoxy resins from the reaction of phenol with formaldehyde and subsequent epoxidation, aliphatic epoxy resins such as from the reaction of aliphatic alcohols or polyols or aliphatic carboxylic acids to give glycidyl ethers or esters, cycloaliphatic epoxides, etc.

Preferably, the flame retardant polymer is comprised of at least 1 wt. % phosphorus and has a number average molecular weight (Mn) of at least about 1000 g/mole to inhibit its solubilization and extraction upon contact with water or polar solvent. In other embodiments, the flame retardant polymer may contain phosphorus at from about 1 wt. % to about 15 wt. %, or from about 2 wt. % to about 14 wt. %, or from about 5 wt. % to about 10 wt. %. In one embodiment, the flame retardant polymer contains at least 7 wt. % phosphorus and in another the flame retardant polymer contains about, 9 wt. % phosphorus and in another 10.6 wt. % phosphorus.

The Mn of the flame retardant oligomer or polymer should be at least 1000 g/mole. The Mn can also more desirably be from about 50,000 g/mole to about 1,000,000 g/mole or infinity, or from about 100,000 g/mole to about 750,000 g/mole or infinity. In one embodiment, the Mn of the flame retardant polymer can be about 200,000 g/mole to about 500,000 g/mole. The molecular weight of the polymer approaches infinity if crosslinked.

Surprisingly, the flame retardant polymers comprised of novel flame retardant monomer compositions provide better flame retardant performance than similar polymers where the phosphate/amine species are not chemically bound to the polymer network or where a different amine is used to salt the phosphate.

Process

In a preferred embodiment, the flame retardant polymer may be produced by first preparing the ester of the mono or polyhydroxyl compound and the source of phosphoric acid. This can be done under a variety of conditions favoring the esterification reaction of the phosphoric acid. Generally, good mixing is desirable and a liquid or liquefied source of the polyhydroxyl compound is desirable. The reaction will generate a little heat, but in small reactors it is desirable to heat the reactants to drive off water (to move the equilibrium of the reaction to the desired product). In the examples, the reaction was often heated to 90° C. for 5 to 10 hours.

The next step in the reaction can be to react the mono or polyhydroxyl phosphate ester prepared into an oligomeric or polymeric material by reacting with an isocyanate compound and/or an epoxy compound reacted with one of the hydroxyl groups of the mono or polyhydroxyl phosphate ester. Both of these reactions are promoted by catalysts that are well known to the art. The temperature can be adjusted based on the reactivity of the a) isocyanate compound, b) epoxy compound, and c) primary or secondary nature hydroxyl group, and the presence of any catalyst to promote the forward reaction to the covalent chemical bond between the oxygen of the hydroxyl group and the carbon of the isocyanate group or epoxy group. In initial preparation the extent of the reaction of the isocyanate and/or epoxy groups can be determined by well-known titration techniques and the reaction time or temperature can be adjusted to achieve sufficient chemical reaction for the intended purpose.

If the mono or polyhydroxyl phosphate ester was incorporated into a urethane or epoxy oligomer or polymer as taught above, the next step is to react the phosphate group(s) of the resulting oligomer or polymer with dicyanodiamide and water to form the guanylurea salt. The oligomer or polymer can be diluted in solvent or plasticizer to help the accessibility of the phosphate groups to the dicyanodiamide and water. The order of addition of the dicyanodiamide and water doesn't seem to be critical. Water can be used in the exact stoichiometric amount or excess or deficient water (on an equivalent basis) can be used. If excess water is used, it may be removed via known techniques before proceeding to the next step(s).

Alternatively, the mono or polyhydroxyl phosphate ester can be first reacted with the water and the dicyandiamide to form the salt of the phosphate ester and guanylurea before the hydroxyl groups of the phosphate ester are reacted with the isocyanate compound or the epoxy compound. Again it is desirable to heat the reactants at this stage to an elevated temperature (such as 90° C. for a few minutes to a few hours to promote salt formation).

If the mono or polyhydroxyl phosphate ester is first reacted with the dicyanodiamide and water, then the next step would be to react that reaction product (now a salt of the phosphate ester with guanylurea) with an isocyanate compound and/or epoxy compound to build the molecular weight. As both the isocyanate compound and the epoxy compound can chemically react with water, it may be desirable to remove any excess water before adding the isocyanate compound (as this would typically convert the isocyanate end group to an amine and release $CO_2$ as a gas). If one desires to form a foamed polyurethane as shown in example 6, the water could be left in the reaction to generate a foam. Again the reaction of the isocyanate and/or epoxy group with the amine groups of the guanylurea and with hydroxyl groups of the phosphate ester will proceed at different rates depending on the reactivity of a) amine groups (primary or secondary), b) hydroxyl groups (primary or secondary), c) the isocyanate compound, and d) the epoxy compound, and the temperature of the reactants and the presence or absence of a catalyst. It is acknowledged that the salt of the guanylurea can act as a catalyst, avoiding the need to add a catalyst. Again the extent of reaction of the isocyanate compound and/or epoxy compound can be followed by some simple well-known titration reactions of unreacted isocyanate or epoxy groups taken from an aliquot of the reactants.

It is noted at this time that any time when the isocyanate compound and/or epoxy compound are reacted with hydroxyl groups or amines, there is an opportunity to added isocyanate-reactive macro monomers or isocyanate reactive chain extenders to change the properties and composition of the resulting urethane or epoxy oligomer or polymer. These two species (macro monomers and chain extenders) will also react with epoxy groups. It would generally be desirable, to promote incorporation of the phosphate ester into the urethane or epoxy oligomer or polymer to react the phosphate ester (in the salt form or not in the salt form) first with the isocyanate or epoxy compound, and then add the isocyanate reactive macro monomer and/or chain extender (in the amount desired). The hydroxyl groups of the phosphate ester (having a higher percentage of secondary hydroxyl groups) than most macro monomers or chain extenders, will react more slowly with the isocyanate functional groups and epoxy functional groups than will primary hydroxyl groups.

It will also be possible to add any solvent, plasticizer, filler, pigments, etc. in most of these reactions, provided the components to not undesirably react with the isocyanate compound and/or epoxy compound. It would also be possible to add crosslinkers (for the isocyanate reaction or the epoxy reaction) at any time after the reaction of the isocyanate compound and/or epoxy compound with the other oligomer or polymer forming compounds is significantly complete. Crosslinkers are generally added near the end as when the composition crosslinks, any unreacted groups become less mobile, mixing is more difficult, and opportunities to shape and store the composition decrease with crosslinking.

The mixture of the at least one mono or polyhydroxyl phosphate ester with either the isocyanate compound and/or the epoxy compound or the dicyanodiamide and water by reacting the components preferably between 10 minutes and 8 hours, more preferably about 1 and 5 hours, and preferably at a temperature of between about 20° C. and 100° C., more preferably 70° C. to 95° C.

In an alternate embodiment, the flame retardant polymer may be produced by first producing a pre-cursor polymer.

Solvent can be employed at any point in the processes.

In the process to produce the flame retardant polymer, the polyphosphate to amine species (P:N) ratio in the amine species reaction step can be from about 1:0.2 to about 1:15. The P:N ratio can also be from about 1:0.5 to about 1:10, or from about 1:1 to about 1:5. Additionally, in either embodiment, the amine species reaction step may be performed in the presence of water. The reaction with dicyandiamide and water will result in the production of a guanylurea salt in the presence of the phosphate ester or another acid. The guanylurea salt with the phosphate moiety in the mono or polyhydroxyl phosphate ester units thus is part of the monomer or repeat unit in a polymer. The complexation reaction may result in other by-products, which by-products are contemplated herein.

Flame Retardant Compositions

The flame retardant polymers may contain conventional ingredients such as solvents, plasticizers, pigments, dyes, fillers, emulsifiers, surfactants, thickeners, rheology modifiers, heat and radiation stabilization additives, defoamers, leveling agents, anti-cratering agents, fillers, sedimentation inhibitors, U.V. absorbers, antioxidants, flame retardants, etc. It may contain other polymeric species such as additional polymers in the forms of blends, interpenetrating networks, urethane-acrylate hybrids, etc.

In one embodiment, the flame retardant polymers may be blended with additional flame retardant additives, which are well known in the literature and art. Exemplary flame retardant additives include non-halogen flame retardants, such as melamine and melamine derivatives, such as melamine cyanurate, melamine borate, melamine phosphate, melamine molybdate; borates; organic phosphates, organic phosphinates such as, for example, Exolit™ OP 1230 and 1311 available from Clariant, and phosphorus containing compounds, such as, 9,10-dihydro-9-oxa-10-phosphaphenanthrene-10-oxide, tetrakis(hydroxymethyl)phosphonium chloride and bis[tetrakis(hydroxymethyl)phosphonium] sulfate; inorganic compounds such as aluminum trihydrate, antimony oxide, ammonium phosphate, ammonium polyphosphate, calcium carbonate, clay, and talc. Although, in some embodiments, the flame retardant polymers are desired to be non-halogenated, blending the flame retardant polymers with halogenated flame retardants, such as chlorinated and brominated compounds, such as pentabromodiphenyl ether, octabromodiphenyl ether, decabromodiphenyl ether, and hexabromocyclododecane, is contemplated herein. Often more than one flame retardant is used and frequently 3 or more flame retardants are combined in flame retardant formulations.

The polymer may be combined with other commercial polymers or polymer dispersions by methods known to those skilled in the art.

Adjuvants useful in the preparation of the polymer and/or in its subsequent use may be added during or subsequent to the polymerization reaction.

Flame Retardant Applications

In one embodiment, the flame retardant compositions described above can be employed as an epoxy or urethane based coating for conventional substrates such as wood, metal, plastics, masonry, stone, etc. Epoxy or urethane based coatings is meant to clarify that the entire coating need not be epoxy or urethane components but the flame retardant phosphate ester guanylurea salt can be incorporated/chemically bonded into an epoxy oligomer and/or urethane oligomer that is then incorporated into other polymeric materials used as a coating. As coatings the flame retardancy is important as it minimizes flame propagation across the surface of the substrates, minimizes smoke generation, and makes for a safer environment should a fire occur near or on the coated substrate. To the extent the coating is on a flammable substrate (such as wood, cellulose, textiles), the coating may prevent ignition of the substrate for an extended period of time by blocking the passage of flammable decomposition products from the substrate to the open flame or source of ignition. On metal, masonry, and stone surfaces the flame retardant coating may protect the substrates from the heat of nearby flames, retaining their mechanical strength so they continue to support themselves and any suspended structures thereon.

The flame retardant epoxy and urethane compositions of this disclosure would also be useful in electronics and items, such as circuit boards, where the electrical circuitry can get hot and sometimes ignite the mechanical support structures, such as the circuit board. Using the epoxy with the functional phosphate ester salted with guanylurea incorporated therein could make the circuit board and other components of the electronic device non-igniting or self-extinguishing.

The use of the flame retardant composition of this invention in a urethane foam involves slightly different safety considerations. Urethane foams are used in transportation vehicles, restaurants, theatres, offices, seating devices, on walls, etc. where the possibility of a fire and flame spreading exits. For safety considerations it would be desirable if urethane foams could be developed that would not ignite or would only ignite after repeated attempts. Self-extinguishing urethane foams would be very desirable in the above uses of foam, such that if another nearby material or fuel ignited, the urethane foam would not ignite or would self-extinguish as soon as the nearby fuel material was consumed.

EXAMPLES

Example 1

Glycerol (18.4 g), glycerol propoxylate (103.3 g, Voranol® polyol, Mn 1,500), and 3.6 g water were placed in a 250 ml 3-neck flask. While stirring under nitrogen atmosphere, 28.4 g of phosphorous pentoxide was added in portions at 45-60° C. The reaction was then kept at 60° C. for two more hours. Dicyandiamide (33.6 g) was then added between 60 and 75° C., followed by 7.2 g water. The reactants was then heated at 80° C. for 2.5 hours. The content was poured into a jar to afford off-white dispersion with small amount of dark red residue in the bottom.

Example 2

Glycerol (9.2 g), Voranol® polyol (57.5 g), polyphosphoric acid (10.6 g, 115% $P_2O_5$) were mixed under nitrogen, while 5.3 g phosphorous pentoxide was added over 10 minutes. The reactants were heated to an elevated temperature for 10 hours. The reactants were cooled down to 60° C. and 16.8 g of dicyandiamide was added in 3 portions at 60-75° C., followed by 3.6 g water. The reaction was heated to 90° C. for 3 hours. The reactants were poured into a jar to get viscous dispersion.

Example 3

Glycerol (9.2 g), Voranol® polyol (60 g), and polyphosphoric acid (16.7 g, 85% $P_2O_5$) were mixed in a 250 g 3-neck flask under nitrogen. The reactants were slowly heated to 90° C. for 6 hours. The reactants were cooled to 60° C. and 16.8 g dicyandiamide was added in 4 portions, followed by 3.6 g water. The reactants were then heated to 90° C. for 2.5 hours to yield creamy white dispersion.

Example 4

Glycerol ethoxylate (133.3 g, Mn 1000) and polyphosphoric acid (16.7 g, 85% $P_2O_5$) were heated to 90° C. for 5.5 hours. Dicyandiamide (16.8 g) was then added in four portions below 90° C., followed by 3.6 g water. Heating was continued at 90° C. for 2.5 hours to obtain a transparent viscous liquid.

Example 5

Glycerol (18.4 g) and glycerol e-p-propoxylate (equivalent wt. 867, 112.7 g, Mn 2600) and polyphosphoric acid (16.7 g, 85% $P_2O_5$) were heated to 90° C. for 7 hours in a 250 ml flask under a nitrogen atmosphere. The next day dicyandiamide (16.8 g) and water (3.6 g) and the contents were heated to 90° C. for 2.5 hours. The mixture was poured into a glass jar.

Example 6, Forming a Polyurethane Foam 20 g of example 5 was mixed with 5.6 g of toluene diisocyanate in a plastic cup. It was then poured into a mold and heated to 120° C. for 30 minutes to form a foam block. Half of the foam block was soaked in tap water overnight to see if the phosphoric acid ester could be removed with the water phase. The block soaked overnight was air dried before testing. The non-soaked block of foam charred when exposed to a flame but did not ignite (burn). The soaked block of foam did not char and did not ignite (burn).

Each of the documents referred to above is incorporated herein by reference. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about". It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

While certain representative embodiments and details have been shown for the purpose of illustrating the subject invention, it will be apparent to those skilled in this art that various changes and modifications can be made therein without departing from the scope of the subject invention.

What is claimed is:

1. A flame retardant composition comprising:
  a polymeric reaction product of
    a) a mono or polyhydroxyl functional phosphate ester compound formed from reacting a polyol with a source of phosphoric acid,
    b) dicyandiamide and water, and
    c) (a) an epoxy compound having an epoxy ring that is reactive with the hydroxyl group to form a covalent chemical bond between a methylene group of the ring and the oxygen of the hydroxyl group on the phosphate ester and/or (b) an isocyanate compound having an isocyanate group that is reactive with the oxygen of the hydroxyl group of the phosphate ester to form a urethane linkage,
  wherein said phosphate ester compound is reacted with said epoxy compound and/or said isocyanate compound to form a polymeric reaction product with a covalent chemical bond between said phosphate ester compound and said epoxy and/or isocyanate compound, and
  wherein said polymeric reaction product is characterized as a flame retardant urethane foam.

2. The flame retardant composition of claim 1, further comprising difunctional or higher functionality polyol macro monomer that also reacts with said epoxy compound and/or isocyanate compound and is therefore incorporated into said polymeric reaction product.

3. The composition of claim 1, wherein said mono or polyhydroxyl functional phosphate is present in said flame retardant composition in an amount sufficient to result in 0.5 to 15 wt. % phosphorus.

4. The composition of claim 1, wherein said dicyanodiamide and water is present in sufficient amounts such that the total nitrogen content of said flame retardant composition attributable to guanylurea is 1 to 30 wt. % of said composition.

5. The composition of claim 1, wherein said dicyanodiamide and water (called guanylurea in the salt form) is in the form of a salt of said phosphate ester compound.

6. The composition of claim 1, wherein said guanylurea is the reaction product of water and dicyandiamide.

7. The composition of claim 1, wherein said flame retardant composition comprises the reaction product of a blend of the guanylurea salt of a mono or polyhydroxyl functional phosphate ester compound reacted with a polyisocyanate and optionally a polyol macro monomer of 2000 to 10,000 g/mole number average molecular weight.

8. The composition according to claim 1, wherein said polymeric reaction product is characterized as a flame retardant urethane coating on a substrate.

9. The composition according to claim 1, wherein said polymeric reaction product is characterized as an epoxy polymer derived from reacting an epoxy containing oligomer having one or more oxirane rings with said polyhydroxyl functional phosphate ester to form a covalent chemical bond and optionally reacting said reactants with a multifunctional crosslinker for said oxirane rings.

10. The composition according to claim 1, wherein said polymeric reaction product is characterized as an epoxy polymer in an electronic device derived from reacting an epoxy containing oligomer having one or more oxirane rings with said polyhydroxyl functional phosphate ester to form a covalent chemical bond and optionally reacting said reactants with a multifunctional crosslinker for said oxirane rings.

11. A process for preparing a flame retardant composition according to claim 1, wherein said mono or polyhydroxyl functional phosphate ester is reacted with said epoxy compound and/or isocyanate compound under conditions sufficient to form a covalent chemical bond forming an epoxy oligomer or urethane oligomer or a mixture thereof.

12. The process according to claim 11, including a step of salting said mono or polyhydroxyl functional phosphate ester with said dicyanodiamide and water before or after it is reacted with said epoxy compound and/or said isocyanate compound.

13. The process according to claim 11, wherein said mono or polyhydroxyl functional phosphate ester is reacted with an isocyanate compound after the phosphate ester has formed a guanylurea salt with said dicyanodiamide and water and the reaction of the said salted phosphate ester with said isocyanate compound forms a foamed urethane.

14. The process according to claim 11, further comprising a step wherein if the guanylurea is salted with said mono or polyhydroxyl functional phosphate ester, any excess unreacted water from the formation of the guanylurea is removed from the guanylurea before the phosphate ester is reacted with said epoxy compound or said isocyanate compound.

15. The process according to claim 14, where said phosphate ester is reacted with an isocyanate compound and since the excess water is removed, the isocyanate compound does not react with water and form a foamed composition.

\* \* \* \* \*